United States Patent [19]  [11] 3,770,547
Kelsey  [45] Nov. 6, 1971

[54] COLOR BOND SURVEILLANCE SYSTEM
[75] Inventor: David H. Kelsey, Van Nuys, Calif.
[73] Assignee: R & G Sloane Manufacturing Company, Inc., Los Angeles, Calif.
[22] Filed: May 14, 1971
[21] Appl. No.: 143,608

[52] U.S. Cl............... 156/314, 117/62.1, 138/146, 156/64, 156/309, 156/310, 161/188, 260/141
[51] Int. Cl............................ B32b 7/12, C09j 5/04
[58] Field of Search...................... 156/314, 64, 309, 156/310; 138/145, 146, DIG. 1; 117/62.1; 161/188; 260/141

[56] References Cited
UNITED STATES PATENTS
2,405,602   8/1946   Nugent ........................... 156/314 X
3,267,064   8/1966   Rawe et al. ........................... 260/38
3,380,987   4/1968   Palm et al. ........................... 260/141

FOREIGN PATENTS OR APPLICATIONS
1,331,994   6/1963   France ................................ 156/64

Primary Examiner—Norman G. Torchin
Assistant Examiner—John R. Miller
Attorney—Tipton D. Jennings

[57] ABSTRACT

A color bond surveillance system to ensure that adequate adhesive bonding has been accomplished between two surfaces where such adequate adhesive bonding requires the application of separate coatings to each of the mating surfaces, such as a primer coating in addition to the adhesive coating, wherein one of the items being bonded contains a first color-precursor compound, the coatings separately applied to each of the mating surfaces contain a second color-precursor compound, and the adhesive coating applied over the first coating contains at least a third color-precursor compound. The at least three color-precursor compounds are co-reactive to produce a desired color different from the colors of the precursors and coating compositions when the coated surfaces are mated, thereby demonstrating proper adhesive installation.

A method for ensuring proper application of separate liquid coatings required to accomplish the satisfactory adhesion of two mating surfaces, comprising incorporating into one of the items providing one of the mating surfaces a first color-precursor compound, incorporating a second color-precursor compound into the coatings applied directly to each of the mating surfaces, incorporating at least a third color-precursor compound into the adhesive coating applied over one of the coatings applied directly to one of the mating surfaces, and super-imposing the coated surfaces.

33 Claims, No Drawings

COLOR BOND SURVEILLANCE SYSTEM

BACKGROUND OF THE INVENTION

It is frequently necessary to join separate components or items by adhesive bonding. Such requirements as, for example, in lamination and the assembly of plastic, ceramic, wood, and metal devices, are well known. The invention herein is applicable to any such adhesive bonding wherein the accomplishment of a satisfactory adhesive bond requires the application of a first liquid coating, such as a primer, directly to each of the surfaces to be bonded, and the application of at least one liquid coating of adhesive to one of the primer-coated surfaces. It is particularly useful in the case of such adhesive bonding required to form joints between two items or components of a system wherein failure of the adhesive bond can result in leakage or other failure of the system. An example of such bonding is that between plastic pipe and plastic pipe fittings in a liquid or gas-carrying system.

Failure or inadequacy of an adhesive bond is frequently caused by over-sight or negligence on the part of the workman, who may omit the application of one or more required coatings, such as the primer, or permit the applied liquid coatings to become excessively dry before successive coatings or mating of the coated surfaces. such improper adhesive installation generally results immediately or eventually in failure of the adhesive bond. In some cases, an adequate bond may not be achieved despite proper adhesive installation because of excessively loose mating fit of the two items, as for example where the OD of a pipe is too small. It has hitherto been difficult for an inspector to determine whether, in fact, fit was adequate after the installation has been made.

The invention herein provides a visible surveillance means for determining whether an adequate adhesive bond has been achieved by the development of a desired color in the finished bond.

Kelsey et al. U.S. Patent application, Ser. No. 134,422, discloses an adhesive installation system which comprises a plurality of fluid coatings, at least one of which is a fluid adhesive composition and at least two of which are separately applied directly to each of the mating surfaces to be adhered wherein different color-precursor components reactive each with the other are separately incorporated into at least the coatings, such as primers, which are applied directly to the mating surfaces. Additional different color-precursor components reactive with the aforementioned color-precursors can be incorporated into additional required coatings, such as adhesive, which are applied over the initial coatings. When the coated surfaces are superimposed, the different reactive color-precursors in the different coatings react to produce the desired color, thereby providing visual assurance of adequate installation.

Although this system is effective and has broad application, it does have some potential disadvantages in some cases. One example is the case where the same primer composition is applied to both of the surfaces to be adhered. The foregoing system requires that the primer be divided into two portions, each containing a different color-precursor. Thus the worker is not only required to carry two separate primers but must also be careful to distinguish between the two, both in application and in use of separate brushes or other applicators to avoid contamination of one primer with the color-precursor in the other primer. Even where the basic primer compositions are in fact somewhat different, workmen frequently tend to use the same applicator with consequent precursor contamination.

These disadvantages are obviated by incorporating into one of the items to be bonded one of the required color-precursor compounds. This eliminates the requirement that each of the first coatings, such as the primer, applied to the mating surfaces contain different color-precursor compounds with its attendant disadvantages. Additionally, if the first coating or primer is properly formulated in terms of color-precursor concentration, the desired color can be obtained in the finished bond only if all of the required coatings have been properly applied.

SUMMARY OF THE INVENTION

The invention relates to an adhesive installation system which comprises a plurality of fluid coatings, at least one of which is a first coating applied directly to each of the two mating surfaces to be adhered and at least one of which is a fluid adhesive applied over the first coating on one of the mating surfaces and comprises the improvement wherein one of the items having one of the two mating surfaces contains dispersed therein a first color-precursor compound, each of the first coatings applied directly to the two mating surfaces contains a second color-precursor compound, and a fluid adhesive coating applied over at least one of the surfaces bearing the first coating, preferably the first-coated surface of the item free from the first color-precursor, contains at least a third color-precursor compound. The at least three color-precursor compounds are co-reactive to produce a desired color.

When the surfaces bearing the coatings containing the reactive color-precursor compounds are placed in superimposed contact, the at least two reactive color-precursors separately contained in the fluid coatings react with each other and with the color precursor in one of the items to be bonded to produce the desired color. Development of the desired color in the finished bond shows that the requisite coatings for a satisfactory adhesive bond have been properly applied during the adhesive installation.

The aforedescribed color bond surveillance system and process are particularly useful where at least the exteriorly visible one of the items being bonded is transparent or translucent so that the color change is immediately visible. It is also useful in the bonding of opaque items as a future means for determining whether failure of the bonded items was caused by the improper adhesive installation or because of flaws in the items which were bonded.

DESCRIPTION OF THE PREFERRED EMBODIMENTS

The compounds reactive to produce the desired color can be any color-precursors or intermediates well known in the chemical, dye, and pigment arts, it being essential only that the reactive compounds in the coatings and in one of the items being bonded co-react to produce the desired color. The number of co-reactive compounds necessary to produce a product having the desired color may be three or more depending on the particular color-precursor system employed. Components such as alkaline buffers, catalysts, and the like, which are essential to the primary reaction are considered to be reactive color-precursor compounds for the purpose of this specification and claims. Preferably the color-precursor reagents selected are compatible with the composition of the item being bonded and with the particular primer or adhesive coatings and in addition soluble in the fluid coatings.

The reactive color-precursor compounds can be organic or inorganic compounds which react to form compounds of different colors.

Particularly useful are the reactive diazo dye intermediates, namely reactive diazo bases and reactive phenolic developers or couplers which react in the presence of an alkaline buffer compound to produce the well known azo dyes. Many reactive diazo bases, reactive phenolic couplers, and appropriate buffers are well known and commercially available, which are soluble in water or organic solvents as required by the particular coating compositions.

Examples of such reactive diazo bases include: diazotized p-nitraniline, diazotized sulfanilic acid, diazotized naphthionic acid, 4-diazo-2,5-diethoxyphenyl morpholine $BF_4$, 4-diazophenyl morpholine $BF_4$, p-diazo-o-chloro-N,N'-diethyl aniline $BF_4$, 4-diazo-2,5-diethoxyphenyl morpholine ½ $ZnCl_2$, 4-diazophenyl morpholine ½ $ZnCl_2$. The borofluoride salt derivatives are particularly useful because of their solubility in organic solvent based coatings.

Examples of reactive phenolic coupling agents include: $\alpha$- and $\beta$-naphthol, naphtholsulfonic acids, aminonaphtholsulfonic acids, 2,3-dihydroxy-naphtholsulfonic acids, 2,3-dihydroxy-naphthalene, 3,5-resorcylic acid ethanolamide, 2,4-resorcylic acid ethanolamide, 4-bromo-3,5-resorcylic acid.

Examples of alkaline buffers, which assist in the diazo base-phenolic coupler reactive system to produce the desired color, include organic mono-, di-, or tertiary-alkylamines, e.g. butyl amine, diisopropylamine, dimethylsoyamine, triethylamine, tributylamine, dimethyl dodecylamine, and the like.

The concentration of the reactive color-precursor compounds incorporated into the item to be bonded and into the coating compositions will vary with the particular compositions and precursors and requires only routine experimentation for the determination of optimum concentrations for a particular application. Care, however, must be exercised that the concentration of the color-precursor compound in the first coating composition applied directly to each or both of the mating surfaces be at least 50 percent of but substantially less than that required to produce the desired color with the at least two other color-precursor compounds available in the system. This is essential to ensure that both the first coatings applied to each of the mating surfaces provide together a sum total of the same color-precursor compound adequate to react with the other at least two color precursors available in the system to produce the desired color and that a first coating applied only to one of the surfaces does not provide an adequate concentration to produce the desired color. The maximum concentration of the color precursor compound in the first coating permissible to avoid development of the desired color after mating of the surfaces if one of the first coatings is not applied to one of the surfaces is largely determined by the particular reactive color-precursors employed. In general, up to about 75 percent of the concentration required to react with the other at least two reactive color precursors available for reaction in the system is adequate. It should be noted that even with the reduced total concentration in a first coating applied only to one surface, some color may develop. However it develops more slowly and is generally of a hue different from that of the desired color which develops with the total concentration provided by both first coatings. It should be noted that the color-precursor contained in the item and available to the system for reaction is limited to precursor at or adjacent to the surface of the item. The precursor at or adjacent to the surface is made available by contact of the item surface with the first coating. It is preferably of a type which is soluble in the liquid first coating. It will be understood that the term "available" as used in this specification and claims in connection with the precursors means those amounts of the precursors that are actually available for reaction after application of the coatings. Since adhesive installations for given uses are generally standardized routines, determination of specific concentrations of each precursor to be incorporated into the item and each of the required coatings to achieve the requisite concentrations during installation requires only routine experimentation for any given use.

The adhesive bonding system may be any conventional system which requires at least three coating applications for satisfactory bonding of two surfaces. Such systems are well known in the adhesive bonding art and, as is also well known, vary with the nature and composition of the surfaces being bonded. In many cases, both of the surfaces to be bonded require a conditioning treatment with a primer coating prior to application of the adhesive coating. The primer composition employed where both surfaces require conditioning may be the same or different, again depending on the nature and composition of the two surfaces to be bonded.

The term adhesive as used herein includes any liquid coating composition which is capable of forming a bond or weld between two superimposed surfaces. It includes natural and synthetic adhesives such as animal and casein glues, epoxies, phenol-aldehydes, urea-aldehydes, polyesters, furanes, asphaltic compounds, sodium silicates, polyvinyl acetate, and the like. They also include solvent cements, such as volatile solvent solutions of polyvinyl chloride, acrylonitrile-butadiene-styrene polymers, cellulose acetate, and the like, which act as welds for solvated plastic surfaces.

The adhesives may be solutions, emulsions, or slurries in an aqueous or volatile organic liquid vehicle, such as ethanol, methanol, methyl ethyl ketone, acetone, tetrahydrofurane, and the like.

The primer can be any conventionally employed liquid composition which prepares the surface of the articles to be bonded for satisfactory adhesive bonding. It may be a volatile organic cleaning solvent or volatile organic solvent which softens or dissolves the surface. It may also be an aqueous or organic solvent solution containing a component which improves the bond between the adhesive and the surface to be bonded.

The color-precursor compound in one of the two items being bonded can be incorporated in any conventional manner prior to forming the item. In the case of a plastic item, for example, the compound can be mixed with the plastic formulation or molding composition prior to molding and cure. The other at least two color-precursor compounds are separately added to and admixed with the first or primer liquid coating or coatings and the adhesive second coating. If more than three color-precursor intermediates are required for development of the desired color, the additional intermediate can be added to the item being bonded or to the first or second coating containing one of the other precursors, with due care as to compatibility, or it can be added to an additional coating.

When all of the coatings containing the reactive color-precursors are properly and successively applied to the surface of the item containing one of the required color-precursor intermediates and to the surface of the item free from precursor, and the coated surfaces are brought into superimposed contact, the reactive color-precursor components are brought into contact in adjacent coatings and the adjacent precursor-containing item or migrate through intermediate coatings to form the desired color. Omission of any required coating will not produce the desired color change. Optimum bonding generally requires that at least the adhesive and preferably also the primer coatings be in fluid or semi-fluid state at the time of successive applications and mating of the surfaces. This also facilitates reaction and migration of the reactive color-precursor intermediates. Thus the color bond surveillance system described herein also provides a means for determining whether the coatings were in the required state during successive coating applications and superimposed contact of the coated surfaces.

Development of the desired color only after completion of adhesive bond installation is ensured by limiting color precursor to one of the items and limiting the concentration of color precursor in the first coatings applied directly to the two surfaces being bonded to substantially less than that required for desired color development. If, for example, the workman omits the first or primer coating, one of the required color-developing intermediates is omitted. If the first or primer coating is applied to one but not the other of the two surfaces, the concentration of color-precursor intermediate in the one first coating applied is inadequate for development of the desired color, given the concentration of color precursor in one of the two items being bonded. Although some color may develop it will be slow and will not be of the desired hue.

Preferably the second adhesive coating containing the at least third color-precursor is applied over the first coating on the surface of the item free from color-precursor since this will minimize any color development prior to contacting of the coated surfaces. Application over the first coating on the surface of the item containing color-precursor will result in some color development. However, since the concentration of precursor in the first coating is inadequate for full color development, the desired color hue develops only after completion of the installation.

The color bond surveillance system is particularly useful when employed in the adhesive bonding of items at least the outer one of which is transparent or translucent, since the color change showing the adequacy of the adhesive installation is immediately visible. It is, however, also useful in the bonding of opaque surfaces. Where the adhesive bonding extends to an edge or edges of the bonded surfaces, the color change (or absence of color change) is visible at such points. It also assists in determining cause of failure of a bonded opaque joint after disassembly.

The system has particular application in the solvent cementing of plastic pipe and fittings. Such pipe and fittings, when made of a solvent-soluble plastic, such as polyvinyl chloride or acrylonitrile-butadiene-styrene polymer, are generally joined by means of a welding cement comprising a solution of the particular pipe or fitting polymer in a volatile solvent which dissolves the joinder surfaces of the pipe and/or fittings. After mating of the solvent-cement coated ends of the pipe and/or fittings, the solvent evaporates leaving a solid, fused joint.

In many cases and very particularly in the case of polyvinyl chloride pipe and fittings, the joinder surfaces require primer treatment with an appropriate solvent or mixture of solvents to soften and dissolve them prior to application of the solvent cement. The primer coated surface must also be still wet or fluid at the time of application of the cement coating and the cement coating must still be wet or fluid at the time of mating contact of the pipe and/or fitting. Selection of reactive color-precursor compounds which react substantially only while in solvent solution provides a monitoring system as to condition of the coatings during installation, since little or no color will develop if the coatings are permitted to dry excessively. Failure by the installer to apply either or both of the primer coatings or to follow instructions as to the condition of the applied coatings, can result in failure of the bonded joint and leakage in the pipe system.

In some cases, despite proper application of the required coatings, an adequate adhesive bond may not be achieved because the OD of the pipe for example may be too small to achieve a tight fit with the fitting socket and, therefore, results in inadequate contact of the applied coatings. Such inadequate coating contact results in incomplete color-precursor reaction and, thereby makes inadequacy of the installation for such reason quickly visible to the inspector.

The color bond surveillance system provides a rapid and effective visible inspection means for determining adequacy of the bonded joint, particularly if the outer mating member, e.g. the pipe fitting, is made of clear transparent plastic, e.g. transparent polyvinyl chloride. Proper color development may also be visible through a translucent plastic. In case the outer joinder surface is opaque, proper use of all of the required coatings may be monitored by the color of the cement which generally extrudes beyond the end of the fitting socket.

Preferably the color-precursor is incorporated into the plastic pipe fitting rather than the pipe to which it is bonded since the considerably smaller size of the fitting reduces the cost of color-precursor requirement as well as for other reasons of convenience.

The co-reactive diazo base-phenolic coupler-buffer dye system is particularly useful in the pipe and fitting application because of its compatibility with such systems. The phenolic coupler is preferably incorporated into the fitting because of its heat stability under high temperature injection molding temperatures. The diazo base if perferably incorporated into the first or primer coating which is applied directly to the surface of the fitting and the pipe. Generally, the same primer, containing the diazo base in the reduced concentration as aforedescribed relative to the concentration of the phenolic coupler in the fitting, can be applied to the mating fitting and pipe surfaces. In some applications primers of somewhat different solvent compositions may be desirable. In such case the same diazo base is dissolved in the different primers so that accidental dipping of the applicator into either applicator has no deleterious effect on the surveillance system. The alkaline buffer is preferably admixed with the second adhesive coating.

EXAMPLES

Standard clear polyvinyl chloride resin blends were mixed in a blender with 0.223 percent by weight of the following phenolic couplers:
A. 2,3-Dihydroxy naphthalene
B. 2,4-Resorcylic acid ethanolamide
C. 4-Bromo-3,5-resorcylic acid Clear transparent fittings were injection molded from the above blends in sizes ranging from three-fourths inch to 3 inches.

A primer for application to both fitting and pipe was prepared by dissolving 0.2 percent by weight of 4-diazo-2,5-diethoxyphenyl morpholine $BF_4$ in a solvent mixture of tetrahydrofurane and cyclohexanone.

Commercial cements comprising a solution of polyvinyl chloride in tetrahydrofurane and cyclohexanone were admixed with the following alkaline buffers:
A. n-Butylamine - 0.1 percent by weight
B. Triethylamine - 0.3 percent by weight 1. The mating surface of a 2 inch deep socket fitting molded from resin blend B and the mating end surface of a length of polyvinylchloride pipe were liberally coated with the primer. Cement A was then applied over the still fluid primer coating on the pipe. The pipe and fitting were then mated. After joinder of the coated surfaces, immediate reaction of the color-precursor compounds developed to a deep blue color visible through the clear plastic fitting.

2. The mating surface of a 3 inch deep socket ell fitting molded from resin blend A and the mating end surface of a length of polyvinyl chloride pipe were liberally coated with the primer. Cement B was then applied over the still fluid primer coating on the pipe. The pipe and fitting were then mated. After joinder of the coated surfaces an immediate color change developed and within 15 seconds the color had developed to the desired deep blue hue. Similar results were obtained with fittings and pipes in sizes ranging from three-fourths inch to 3 inch.

3. The same procedure was followed as in Example 2 except that the pipe only was primed. When the pipe and unprimed fitting were joined, no reaction became visible for several hours. After 24 hours a mottled light purple color had developed.

4. The same procedure was followed as in Example 2 except that the fitting only was primed and the cement was applied to the umprimed pipe. Color was slow to develop and when developed was a distinct purple rather than the desired deep blue.

Although this invention has been described with reference to illustrative embodiments thereof, it will be apparent to those skilled in the art that the principles of this invention can be embodied in other forms but within the scope of the claims.

I claim:

1. In a method for adhesively bonding two surfaces of two items wherein effective bonding requires the separate application of a first liquid coating directly to each of said surfaces and a second liquid coating over one of the first directly-applied coatings, at least the second liquid coating being a liquid adhesive composition, the improvement comprising:
   1. incorporating a first color-precursor compound into at least one item having one of said two surfaces;
   2. incorporating a second color-precursor compound into each of the first directly-applied coatings; and
   3. incorporating at least a third color-precursor compound into the second liquid coating;
   said first, second, and at least third color-precursor compounds being reactive to produce a desired color and said second color-precursor compound being incorporated into each of the first directly-applied coatings in an amount of at least about 50 percent, but substantially less than, that required to react with the other available color-precursor compounds to produce the desired color.

2. The method of claim 1 in which the first color-precursor compound is a phenolic coupler, the second color-precursor compound is a diazo base, and the third color-precursor compound is an alkaline buffer.

3. The method of claim 2 in which the alkaline buffer is an alkyl amine.

4. The method of claim 1 in which the two items are respectively plastic fitting and plastic pipe and the first color-precursor is incorporated into the plastic fitting.

5. The method of claim 2 in which the two items are respectively plastic fitting and plastic pipe and the first color-precursor is incorporated into the plastic fitting.

6. The method of claim 3 in which the two items are respectively plastic fitting and plastic pipe and the first color-precursor is incorporated into the plastic fitting.

7. The method of claim 6 in which the alkyl amine is a primary amine.

8. The method of claim 6 in which the alkyl amine is a tertiary amine.

9. The method of claim 4 in which the plastic fitting is made of transparent polyvinyl chloride.

10. The method of claim 5 in which the plastic fitting is made of transparent polyvinyl chloride.

11. The method of claim 6 in which the plastic fitting is made of transparent polyvinyl chloride.

12. In a method for adhesively bonding a first surface of a first item to a second surface of a second item wherein effective bonding requires the separate application of a first liquid coating directly to each of said surfaces and a second liquid coating over one of the first directly-applied coatings, at least the second liquid coating being a liquid adhesive composition, the improvement comprising:
   1. applying to said first surface of said first item, which contains dispersed therein a first color-precursor, a first liquid coating containing a second color-precursor compound;
   2. applying to said second surface of said second item, which is free from said first color-precursor, a first liquid coating containing said second color-precursor compound;
   3. applying over said first coating on at least one of said surfaces a liquid adhesive coating containing at least a third color-precursor compound, said first, second, and at least third color-precursor compounds being reactive to produce a desired color, and said second color-precursor compound being present in each of the first liquid coatings applied to said first and second surfaces in an amount of at least about 50 percent, but substantially less than, that required to react with the other available color-precursor compounds to produce the desired color; and 4. superimposing said surfaces bearing said coatings.

13. The method of claim 12 in which the liquid adhesive coating containing the at least third color-precursor compound is applied over the first coating on said second surface.

14. The method of claim 13 in which the first color-precursor compound is a phenolic coupler, the second color-precursor compound is a diazo base, and the third color-precursor compound is an alkaline buffer.

15. The method of claim 14 in which the alkaline buffer is an alkyl amine.

16. The method of claim 13 in which the first item is a plastic fitting and the second item is plastic pipe.

17. The method of claim 14 in which the first item is a plastic fitting and the second item is plastic pipe.

18. The method of claim 15 in which the first item is a plastic fitting and the second item is plastic pipe.

19. The method of claim 16 in which the plastic fitting is made of transparent polyvinyl chloride.

20. The method of claim 17 in which the plastic fitting is made of transparent polyvinyl chloride.

21. The method of claim 18 in which the plastic fitting is made of transparent polyvinyl chloride.

22. The method of claim 21 in which the alkyl amine is a primary amine.

23. The method of claim 21 in which the alkyl amine is a tertiary amine.

24. In a method for adhesively bonding a first surface of a first item to a second surface of a second item wherein effective bonding requires the separate application of first liquid coatings to each of said surfaces and a second liquid coating over one of said first liquid coatings, at least the second liquid coating being a liquid adhesive composition, the improvement comprising:

1. applying to said first surface of said first item, which contains dispersed therein a first color-precursor, a first liquid coating containing a second color-precursor compound;

2. applying to said second surface of said second item, which is free from said first color-precursor, a first liquid coating containing said second color-precursor compound;

3. applying over said first coating on said second surface, a liquid adhesive coating containing at least a third color-precursor compound, said first, second, and at least third color-precursor compounds being reactive to produce a desired color;

4. superimposing said surfaces bearing said coatings.

25. The method of claim 24 in which the first liquid coating applied to the first and second surfaces each contain the second color-precursor compound in an amount of at least about 50 percent, but substantially less than, that required to react with the other available color-precursor compounds to produce the desired color.

26. The method of claim 24 in which the first color-precursor compound is a phenolic coupler, the second color-precursor compound is a diazo base, and the third color-precursor compound is an alkaline buffer.

27. The method of claim 26 in which the alkaline buffer is an alkyl amine.

28. The method of claim 24 in which the first item is a plastic fitting and the second item is plastic pipe.

29. The method of claim 26 in which the first item is a plastic fitting and the second item is plastic pipe.

30. The method of claim 28 in which the plastic fitting is made of transparent polyvinyl chloride.

31. The method of claim 27 in which the alkyl amine is a primary amine.

32. The method of claim 27 in which the alkyl amine is a tertiary amine.

33. The method of claim 24 in which said first liquid coatings are primer coatings.

* * * * *

UNITED STATES PATENT OFFICE
CERTIFICATE OF CORRECTION

Patent No. 3,770,547  Dated November 6, 1973

Inventor(s) David H. Kelsey

It is certified that error appears in the above-identified patent and that said Letters Patent are hereby corrected as shown below:

Page 1, at "[45]" change the date of issuance from "Nov. 6, 1971" to --Nov. 6, 1973--.

Signed and sealed this 9th day of April 1974.

(SEAL)
Attest:

EDWARD M. FLETCHER, JR.
Attesting Officer

C. MARSHALL DANN
Commissioner of Patents